2,396,013

UNITED STATES PATENT OFFICE 2,396,013

INSECT REPELLENT COMPOSITIONS

Howard A. Jones and Bernard V. Travis, Orlando, Fla.; dedicated to the free use of the People in the territory of the United States No Drawing. Application March 9, 1945, Serial No. 581,820

2 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

We hereby dedicate the invention herein described to the free use of the people in the territory of the United States to take effect on the granting of a patent to us.

This invention relates to insect repellent compositions and has among its objects the provision of effective and long lasting compositions for repelling insect pests, particularly mosquitoes.

It has been found that effective insect repellent compositions can be prepared by employing as their essential active ingredients substituted cyclohexanols having the general formula:

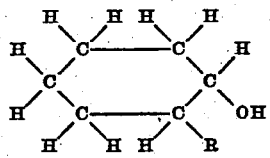

wherein R is a cyclohexyl, aryl or substituted aryl radical. For example, 2-cyclohexylcyclohexanol, 2-phenylcyclohexanol, 2-(p-tolyl)-cyclohexanol, 2-(m-tolyl)-cyclohexanol, and 2-(2,5-dimethylphenyl)-cyclohexanol (one of the 2-xylylcyclohexanols) have been found to repel insects for considerable periods of time.

These substituted cyclohexanols may be used in numerous ways to repel insects. They may be applied to the exposed parts of the body or to clothing, either in the undiluted form or in suitable inert carriers, such as solvents like mineral oils, vegetable oils, various alcohols, etc. They may also be incorporated into inert powders to obtain a paste or cream for application to the skin and may also be applied in the form of an aqueous emulsion or in a solution of a volatile solvent, particularly in the treatment of clothing, to prevent mosquito bites and chigger attachments. For example, when applied to impregnate clothing, 2-phenylcyclohexanol and 2-cyclohexylcyclohexanol have been found to be very effective in preventing the attachment of Trombiculidae (chiggers). It has been found further that 2-phenylcyclohexanol, in addition to its repellent action against chiggers is also toxic to this insect, being very rapid in its action. It has also been found to be toxic to adults and eggs of the body louse (*Pediculus humanus corporis* Deg.) and appears, in addition, to possess scabicidal properties.

It has been found, furthermore, that in any of the aforementioned modes of application, mixtures or blends of individual substituted cyclohexanols may be employed. They may also be mixed with known insect repellent substances, such as dimethyl phthalate and 2-ethyl-1,3-hexanediol.

The compositions of this invention have been tested by the standard method employed in evaluating insect repellent compositions. In this method one-fourth teaspoonful of the material to be tested is applied to the forearm from wrist to elbow and the arm then exposed to a large number of hungry mosquitoes or other biting insects, the time elapsing to the first bite being recorded. This test is of a practical nature and gives results that are highly indicative of the insect repellent in actual field use.

The following table illustrates the results obtained against *Aedes aegypti* and *Anopheles quadrimaculatus*, as examples of the insects against which the invention is applicable, using the above method and utilizing 2-cyclohexylcyclohexanol, 2-phenylcyclohexanol, 2-(p-tolyl)-cyclohexanol, 2-(m-tolyl)-cyclohexanol, and 2-(2,5-dimethylphenyl)-cyclohexanol in undiluted form, diluted with inert carriers, such as a powder to form a cream, and mixed with other known insect repellent substances.

| Repellent composition | Average repellent time to first bite in minutes | |
|---|---|---|
| | *Aedes aegypti* | *Anopheles quadrimaculatus* |
| 2-cyclohexylcyclohexanol | 205 | 34 |
| 2-phenylcyclohexanol | 428 | 67 |
| 2-(p-tolyl)cyclohexanol 33.3%; benzyl acetate [1] 66.7% | 86 | 23 |
| 2-(m-tolyl)cyclohexanol | 222 | 38 |
| 2-(2, 5-dimethylphenyl)-cyclohexanol | 218 | 30 |
| 2-cyclohexylcyclohexanol 50%; olive oil 50% | 64 | 62 |
| 2-cyclohexylcyclohexanol 50%; ethyl alcohol 50% | 81 | |
| 2-phenylcyclohexanol 50%; olive oil 50% | 356 | 28 |
| 2-phenylcyclohexanol 65%; calcium stearate 35% | 370 | 67 |
| 2-phenylcyclohexanol 65%; bentonite 32%; calcium stearate 3% | 413 | 81 |
| 2-phenylcyclohexanol 20%; dimethyl phthalate 80% | 256 | 109 |
| 2-phenylcyclohexanol 50%; dimethyl phthalate 50% | 283 | 117 |
| 2-phenylcyclohexanol 25%; dimethyl phthalate 50%; 2-ethyl-1, 3-hexanediol 25% | 274 | 67 |

[1] Benzyl acetate exhibits no appreciable repellency to these two species of mosquitoes.

In addition to the foregoing examples as shown in the above table, a large number of tests were conducted against natural populations of *Aedes taeniorhynchus* and the biting fly, *Stomoxys calcitrans*, under actual field conditions. It was found that they gave good repellent action, for example 2-phenylcyclohexanol giving an average protection time of 297 minutes to the first bite against the former insect and an average protection time of 344 minutes to the first bite of the latter.

Having thus described our invention, what is claimed is:

1. An insect repellent composition comprising 2-phenylcyclohexanol incorporated in a carrier.
2. A method of repelling insects comprising applying to the area from which the insects are to be repelled an insect repellent composition containing 2-phenylcyclohexanol as its essential active ingredient.

HOWARD A. JONES.
BERNARD V. TRAVIS.